(12) United States Patent
Huang et al.

(10) Patent No.: US 8,426,532 B2
(45) Date of Patent: Apr. 23, 2013

(54) POLYCARBONATE GRAFT COPOLYMERS

(75) Inventors: Rubin Huang, Zwolle (NL); Andre van Zyl, Bergen op Zoom (NL); Jan Pleun Lens, Rotterdam (NL); Theodorus Lambertus Hoeks, Bergen op Zoom (NL); Hans-Peter Brack, Herrliberg (CH); Jan Henk Kamps, Noord Brabant (NL)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 249 days.

(21) Appl. No.: 12/885,249

(22) Filed: Sep. 17, 2010

(65) Prior Publication Data

US 2012/0071606 A1    Mar. 22, 2012

(51) Int. Cl.
| | |
|---|---|
| *C08L 69/00* | (2006.01) |
| *C08G 64/18* | (2006.01) |
| *C08F 290/14* | (2006.01) |
| *C08F 283/02* | (2006.01) |

(52) U.S. Cl.
USPC .......... 525/467; 525/468; 525/469; 528/203; 528/204

(58) Field of Classification Search ........................ None
See application file for complete search history.

(56) References Cited

U.S. PATENT DOCUMENTS

| | | | |
|---|---|---|---|
| 3,124,554 A | 3/1964 | Schnell et al. | |
| 3,225,119 A | 12/1965 | Baker, Jr. | |
| 3,462,515 A | 8/1969 | Cantrill | |
| 3,692,870 A | 9/1972 | Schnell et al. | |
| 3,991,009 A | 11/1976 | Margotte et al. | |
| 4,469,852 A | 9/1984 | Tyrell et al. | |
| 5,034,503 A | 7/1991 | Camberlin | |
| 5,094,876 A * | 3/1992 | Goldberg et al. | ............. 428/481 |
| 5,426,159 A | 6/1995 | Umemura | |
| 5,510,429 A | 4/1996 | Lee et al. | |
| 6,043,334 A | 3/2000 | Kanamaru et al. | |
| 7,498,397 B2 | 3/2009 | Mahood | |
| 2005/0140051 A1 | 6/2005 | Dean et al. | |
| 2008/0171835 A1 | 7/2008 | Sebe et al. | |
| 2009/0124749 A1 | 5/2009 | Steendam et al. | |

FOREIGN PATENT DOCUMENTS

| | | |
|---|---|---|
| EP | 1 325 947 A2 | 7/2003 |
| EP | 1 325 947 A3 | 1/2004 |
| JP | 9278839 | 10/1997 |
| JP | 2002-030125 * | 1/2002 |

OTHER PUBLICATIONS

International Search Report mailed Apr. 2, 2012 for International Application No. PCT/US2011/051940.

* cited by examiner

*Primary Examiner* — David Buttner (74) *Attorney, Agent, or Firm* — Richard M. Klein; Fay Sharpe LLP (57) ABSTRACT

Methods of forming polycarbonate graft copolymers are provided. In particular, a polycarbonate polymer or copolymer containing allyl groups provides the backbone for the graft copolymer, and pendant chains are attached to the copolymer through the allyl groups. The graft copolymers exhibit a combination of high transparency, good graft levels, good scratch resistance, and/or good anti-fog properties.

7 Claims, 5 Drawing Sheets

POLYCARBONATE GRAFT COPOLYMERS

BACKGROUND

The present disclosure relates, in various exemplary embodiments, to certain polycarbonate graft copolymers and articles formed from such graft copolymers. The graft copolymers exhibit properties such as high scratch resistance and/or high anti-fog properties. Also disclosed are methods for preparing and/or using the same.

Polycarbonates are synthetic thermoplastic resins derived from bisphenols and phosgene, or their derivatives. They are linear polyesters of carbonic acid and can be formed from dihydroxy compounds and carbonate diesters, or by ester interchange. Polymerization may be in aqueous, interfacial, or in nonaqueous solution.

Polycarbonate-based materials are used in a broad variety of applications because of their high transparency, clarity, heat resistance, ignition resistance, toughness, stability, impact resistance, creep resistance, and mechanical strength. Due to their optical quality, polycarbonates can be used in lighting applications including automotive headlamp lenses, covers and lenses for other optical devices, as well as transparent films and sheets. They can also be used in a wide variety of molded products such as medical devices, radio and TV bezels (i.e. grooved rims for holding glass or plastic panes such as lenses, tuning dials, and other indicating devices), mobile phone keypads, notebook computer housings and keys, optical display films, automotive parts, and other electronic and consumer products.

Scratch resistance is useful for articles whose exterior surface may be subject to physical contact by other objects. For example, everyday activities which can scratch an article may include sliding on a surface, dropping, and rubbing against other items such as coins or keys when placed in a pocket. Polymer compositions with scratch resistance are therefore desirable in articles requiring a durable surface finish and appearance.

In particular, polycarbonates based on bisphenol A (BPA) have limited scratch resistance. One method of preventing or minimizing scratch damage is to apply a hardcoat to an article formed from a BPA polycarbonate. This hardcoat requires another manufacturing step, adding additional cost to the article. Other disadvantages include durability and complexity.

Another method is to use a scratch-resistant material made from a copolymer of BPA and dimethyl bisphenol cyclohexane (DMBPC). However, these copolymers also have decreased impact properties and ductility compared to polycarbonates based on BPA.

BPA polycarbonate is also easily fogged by water condensing on cold surfaces with low surface tension. Fogging lessens the advantage of the optical properties of BPA polycarbonate.

One method of reducing or eliminating fog formation on the surface of BPA polycarbonate or other thermoplastics is to add an anti-fog coating. Another method is to use sulfonation techniques to introduce hydrophilic functionality on the molecules. However, both of these methods are inconvenient and expensive. Additionally, widely used anti-fog additives for polyolefins are either not thermally stable, not miscible with polycarbonate, or simply not effective in polycarbonate. Some additives become surface active only after conditioning under specific conditions. Others are miscible with polycarbonate, but reduce the glass transition temperature. Even where the additives are thermally stable and surface active, they may not be permanent due to the lack of chemical bonding between the additives and polymer matrices.

It would be desirable to provide a polycarbonate composition having improved anti-scratch and/or anti-fog properties. In particular, it would be desirable to provide such polycarbonates possessing these properties without the need for additional coating or post-mold treatments. The polycarbonate composition would be useful for certain transparent articles, such as optical parts, among other applications.

BRIEF DESCRIPTION

Disclosed in various embodiments are polycarbonate graft copolymers and processes for making and using them. The polycarbonate graft copolymers have good anti-fog and/or anti-scratch properties.

Disclosed in embodiments is a graft copolymer comprising: a polycarbonate polymer backbone comprising repeating units derived from diallyl bisphenol A (DABPA), and pendant chains grafted to the polycarbonate polymer backbone, wherein the pendant chains are derived from a radically-polymerizable unsaturated monomer. Exemplary monomers include at least one of the following: vinylpyrrolidone, an acrylate, styrene, dialkylsiloxane, and a perfluorinated vinyl compound.

The polycarbonate polymer backbone may further comprise repeating units derived from bisphenol A (BPA), 1,1-bis(4-hydroxy-3-methylphenyl)cyclohexane (DMBPC), or other similar monomers as discussed further herein.

The repeating units derived from DABPA generally comprise at least 5 mole % of the polycarbonate copolymer backbone. In some embodiments, the repeating units derived from DABPA comprise at least 10 mole % of the polycarbonate copolymer backbone. In other embodiments, the repeating units derived from DABPA comprise from about 5 to about 10 mole % of the polycarbonate copolymer backbone.

The pendant chains comprise at least 2 wt % of the graft copolymer. In more specific embodiments, the pendant chains comprise from 5 to about 60 wt % of the graft copolymer, including from about 10 to about 50 wt %, from about 20 to about 50 wt %, and from about 25 to about 60 wt %.

In embodiments, the pendant chains have a weight average molecular weight (Mw) of less than about 60,000 to maintain transparency. In more specific embodiments, the pendant chains have a weight average molecular weight (Mw) of from about 20,000 to about 60,000, including from about 20,000 to about 40,000.

The graft copolymer may have a light transmission (% T) of at least 89% as measured by ASTM D1003, or a haze number of 5 or less as measured by ASTM D1003 on a film having a thickness of 25 microns.

Disclosed in other embodiments is a graft copolymer comprising: a polycarbonate polymer backbone comprising repeating units derived from diallyl bisphenol A (DABPA); and pendant chains grafted to the polycarbonate polymer backbone, wherein the pendant chains are derived from an acrylate monomer.

In particular embodiments, the acrylate monomer is methyl methacrylate.

The graft copolymer may have a scratch depth of less than 4,100 nanometers measured according to ISO 1518, including less than 3,700 nanometers or less than 2,900 nanometers. The graft copolymer may also have pendant chains having a weight average molecular weight of greater than about 50,000. The graft copolymer may also have a haze number of 1 or less.

In specific embodiments, the graft copolymer uses methyl methacrylate as the acrylate monomer, the pendant chains have a weight average molecular weight of greater than about 50,000, e.g. 50,000 to 60,000, and the pendant chains comprise at least 35 wt % of the graft copolymer. A polymer composition comprising this graft copolymer along with poly (methyl methacrylate) homopolymer is also disclosed.

In still other embodiments is disclosed a graft copolymer comprising: a polycarbonate polymer backbone comprising repeating units derived from diallyl bisphenol A (DABPA); and polyvinylpyrrolidone pendant chains grafted to the polycarbonate copolymer backbone.

This graft copolymer may have a water contact angle of less than about 45° as measured by ASTM D7334.

Also disclosed in embodiments is a process for producing a polycarbonate graft copolymer. An initial solution comprising a polycarbonate copolymer and a solvent is provided, and then heated to an initial temperature to dissolve the polycarbonate copolymer. Next, a first amount of initiator is added to the initial solution. Then, a first amount of monomer is added to the initial solution to form an intermediate mixture and the intermediate mixture is reacted for a first period of time. A polycarbonate graft copolymer is formed. A second amount of initiator and a second amount of monomer are then added to the intermediate mixture, and the intermediate mixture is reacted for a second period of time to form the polycarbonate graft copolymer. This "second shot" extends the polymerization of the copolymer. The monomer may be a radically polymerizable unsaturated monomer.

Regarding the temperature at which the graft polymerization occurs, one of ordinary skill in the art would be able to determine what the necessary temperature should be for a desired reaction product without undue experimentation. In one embodiment, the initial temperature may be from about 40° C. to about 80° C.

The reaction time for the graft polymerization can vary, e.g. depending on the step of the polymerization process. In one embodiment, the first period of time may be from about 5 hours to about 48 hours. In another embodiment, the second period of time may be from about 5 hours to about 24 hours. In yet another embodiment, a third time period of from about 1 to about 2 hours passes between the addition of the first amount of initiator and the addition of the first amount of monomer.

In one embodiment, the first amount of monomer can be added to the initial solution over an addition period of from about 1 hour to about 24 hours, including from about 7 hours to about 8 hours. Alternatively, the first amount of initiator and the first amount of monomer are added to the initial solution simultaneously.

The ratio of the weight of the polycarbonate copolymer to the volume of the solvent (grams/mL) may be about 5:1.

Various types of initiators can be utilized, such as free radial initiators. In one embodiment, the initiator is a 2,2'-azobisisobutyronitrile or derivative thereof.

Also disclosed are molded articles formed from such polycarbonate graft copolymers.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

As used in the specification and in the claims, the term "comprising" may include the embodiments "consisting of" and "consisting essentially of."

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph—).

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted.

The term "aryl" refers to an array of atoms which is aromatic and which is composed exclusively of carbon and hydrogen. Aryl groups may be substituted or unsubstituted. An exemplary aryl group is phenyl.

The term "perfluoroalkyl" refers to a linear or branched array of atoms that is composed exclusively of carbon and fluorine.

A graft copolymer is a type of branched copolymer in which the polymer backbone and the pendant chains are formed from different monomers. This differs from a block copolymer, wherein the different monomers are present in the backbone. Below is an illustrative difference between a graft copolymer and a block copolymer:

The polycarbonate graft copolymers of the present disclosure have a polycarbonate polymer backbone and pendant chains grafted to the polycarbonate polymer backbone. The pendant chains are derived from monomers as specified further herein.

The polycarbonate polymer backbone is derived from the reaction of at least one dihydroxy compound with phosgene. In particular, the polycarbonate polymer backbone comprises repeating units derived from diallyl bisphenol A. Diallyl bisphenol A is also known as 2,2'-Diallylbisphenol A; 4,4'-isopropylidenebis(2-allylphenol); 4,4'-(1-methylethylidene) bis[2-(2-propenyl)]phenol; 2,2-bis(3-(2-propenyl)-4-hydroxyphenyl)propane; and DABPA. Illustrated below is DABPA and the repeating unit derived from DABPA:

In additional embodiments, the polycarbonate polymer backbone is a copolymer backbone. As used herein, the term "copolymer" means the polymer contains two or more different monomers, or in other words has repeating units derived from DABPA and a second dihydroxy compound. The term "dipolymer" will be used herein to refer to a polymer containing only two different monomers. The second dihydroxy compound may have the structure of Formula (I):

wherein R$_1$ through R$_8$ are each independently selected from hydrogen, nitro, cyano, C$_1$-C$_{20}$ alkyl, C$_1$-C$_{20}$ aliphatic, C$_4$-C$_{20}$ cycloalkyl, and C$_6$-C$_{20}$ aryl; and A is selected from a bond, —O—, —S—, C$_1$-C$_{12}$ alkyl, C$_6$-C$_{20}$ aromatic, C$_1$-C$_{20}$ aliphatic, and C$_6$-C$_{20}$ cycloaliphatic.

The second dihydroxy compound may also have the structure of Formula (II):

Formula (II)

wherein each $R^h$ is independently a $C_{1-10}$ alkyl group, and n is 0 to 4.

In specific embodiments, the second dihydroxy compound used in the polycarbonate polymer backbone is 2,2-bis(4-hydroxyphenyl) propane (i.e. bisphenol A or BPA). Other illustrative compounds of Formula (I) include: 2,2-bis(4-hydroxy-3-methylphenyl)propane (dimethyl BPA or DMBPA); 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxy-3-methylphenyl) cyclohexane (DMBPC); 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene. In other specific embodiments, the second dihydroxy compound is DMBPA or DMBPC. Terpolymers (i.e. containing three monomers) of DABPA combined with any two monomers selected from the group consisting of BPA, DMBPA, and DMBPC are also contemplated. Terpolymers of DABPA, BPA, and either DMBPA or DMBPC are also specifically contemplated.

In embodiments, the repeating units derived from DABPA comprise at least 5 mole percent (mole %) of the polycarbonate polymer backbone. In other embodiments, the repeating units derived from DABPA comprise at least 5 mole percent (mole %) of the polycarbonate polymer backbone. In still other embodiments, the repeating units derived from DABPA comprise from 5 to about 25 mole % of the polycarbonate polymer backbone, including from 5 to about 10 mole %. In particular embodiments, a polycarbonate copolymer backbone is derived from repeating units of DABPA and BPA.

The polycarbonate polymer backbone of the present disclosure can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Exemplary processes are shown in U.S. Pat. No. 6,306,507. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or a $C_{8-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Pendant chains are grafted to the polycarbonate polymer backbone. Those pendant chains are covalently bonded through the allyl groups on the DABPA repeating unit. The pendant chains are derived from at least one radically-polymerizable unsaturated monomer. "Radically-polymerizable" means the monomer can be polymerized by free radical polymerization. "Unsaturated" means the monomer contains at least one double bond through which the monomer can be polymerized; that double bond is typically a carbon-carbon double bond. Exemplary monomers include vinylpyrrolidone, acrylates, styrene compounds, dialkylsiloxanes of the formula $R_2SiO$, perfluorinated vinyl compounds, acrylonitrile or methacrylonitrile, acrylamides, N-vinyl carbazole, and vinyl esters. It is also contemplated that the pendant chains could be derived or formed from two or more monomers. In specific embodiments, the pendant chains are derived from a monomer containing at least one of the following: vinylpyrrolidone, an acrylate, a styrene compound, dialkylsiloxane, and a perfluorinated vinyl compound. Vinylpyrrolidone is illustrated below.

Vinylpyrrolidone

Acrylates are shown below in Formula (III):

Formula (III)

wherein R' and R" are independently hydrogen, $C_1$-$C_{20}$ alkyl, or aryl. In particular embodiments, the acrylate is methyl methacrylate (i.e. R' and R" are both methyl).

Styrene compounds are shown below in Formula (IV):

Formula (IV)

wherein $R^g$, $R^h$, $R^j$, and $R^k$ are independently hydrogen, halogen, and $C_1$-$C_{20}$ alkyl; and n is an integer from 0 to 5. In particular embodiments, the styrene compound is styrene ($R^g$, $R^h$, $R^j$, and $R^k$ are all hydrogen), or alpha-methyl styrene ($R^g$ is methyl). Substitutions to the aromatic ring are possible. Exemplary styrene compounds with substitutions on the aromatic ring include para-methyl styrene, fluorostyrene, bromostyrene, and trifluorostyrene.

Dialkylsiloxanes are shown below in Formula (V):

Formula (V)

wherein $R^a$ and $R^b$ are independently $C_1$-$C_{20}$ alkyl. In particular embodiments, the dialkylsiloxane is dimethylsiloxane (i.e. $R^a$ and $R^b$ are both methyl).

Perfluorinated vinyl compounds are shown below in Formula (VI):

Formula (VI)

wherein $R^c$, $R^d$, $R^e$, and $R^f$ are independently hydrogen, fluorine, or $C_1$-$C_{20}$ perfluoroalkyl, with the proviso that at least one of $R^c$, $R^d$, $R^e$, and $R^f$ is $C_1$-$C_{20}$ perfluoroalkyl.

In one embodiment, the pendant chains are derived from methyl methacrylate or vinylpyrrolidone. Put in other words, the pendant chains are poly(methyl methacrylate) (PMMA) or polyvinylpyrrolidone (PVP).

In another embodiment, the pendant chains comprise at least 2 weight percent (wt %) of the overall graft copolymer. In other embodiments, the pendant chains comprise at least 35 wt % of the graft copolymer, including from 2 to about 60 wt %, from about 10 to about 40 wt %, from about 20 to about 40 wt %, and from about 20 to about 60 wt % of the graft copolymer. The weight percentage of the pendant chains is measured after washing of the graft copolymer product, and is not determined based on the amounts of reactants in the polymerization reaction.

The weight average molecular weight (Mw) of the pendant chains is a reasonable proxy for the number of repeating units in the pendant chain. The Mw can be determined using known means, such as size exclusion chromatography and/or dynamic light scattering after hydrolysis to separate the pendant chains from the polymer backbone. In particular embodiments, the pendant chains have a weight average molecular weight of less than about 60,000, and may particularly have a weight average molecular weight of from about 20,000 to about 60,000 or from about 20,000 to about 40,000.

In particular embodiments, the polycarbonate graft copolymer contains a backbone which is a copolymer of bisphenol A and diallyl bisphenol A, and contains pendant chains derived from an acrylate, particularly methyl methacrylate. The pendant chains may comprise from 2 to about 40 wt % of these graft copolymers, including from about 20 to about 40 wt %. The pendant chains may also have a weight average molecular weight of less than about 40,000, and in particular have a weight average molecular weight of from about 20,000 to about 60,000. They may have a light transmission (% T) of at least 89% as measured by ASTM D1003, and/or a haze number of 5 or less as measured by ASTM D1003, on films having a thickness of 25 microns (0.25 mm).

In another embodiment, the polycarbonate graft copolymer contains a backbone which is a dipolymer of bisphenol A and diallyl bisphenol A, and contains pendant chains derived from methyl methacrylate. The pendant chains comprise at least 35 wt % of such graft copolymers and may also have a weight average of greater than about 50,000, e.g. 50,000 to 60,000. They may have a light transmission (% T) of at least 89% as measured by ASTM D1003, and/or a haze number of 1 or less as measured by ASTM D1003, on films having a thickness of 25 microns (0.25 mm).

These polycarbonate graft copolymers having acrylate pendant chains exhibit considerable improvements in scratch resistance in addition to good transparency. In embodiments, the graft copolymer has a scratch depth of less than 4,100 nanometers when measured according to ISO 1518, including less than 3,700 nanometers and less than 2,900 nanometers. Briefly, an Erichson scratch tester applies a force of six Newtons to a conical stylus with a radius of 0.01 mm to form an indentation on the surface of a sample, and the depth of the indentation is measured with a Dektak® profilometer.

In other particular embodiments, the polycarbonate graft copolymer contains a backbone which is a dipolymer of bisphenol A and diallyl bisphenol A, and contains pendant chains derived from vinylpyrrolidone. The pendant chains may comprise from about 2 to about 60 wt % of these graft copolymers, including from about 20 to about 60 wt %.

These polycarbonate graft copolymers having vinylpyrrolidone pendant chains have improved anti-fog properties in combination with good transparency. In embodiments, the graft copolymer exhibits a water contact angle of less than about 45° as measured by ASTM D7334. This angle is determined by measuring the advancing contact angle on a flat surface of the graft copolymer.

Processes for making the polycarbonate graft copolymers are also contemplated in this disclosure. Initially, a polycarbonate polymer or copolymer is provided. As noted above, the polycarbonate polymer comprises repeating units derived from DABPA. The polycarbonate polymer is combined with a solvent to form an initial solution. The initial solution is then heated to dissolve the polycarbonate polymer. Generally, the initial solution may be heated to an initial temperature up to the boiling point of the solvent. However, in embodiments, the initial temperature is from about 23° C. to about 80° C., including from about 40° C. to about 80° C. The heating is typically performed over a period of from about 5 to about 30 minutes, although the time may be extended as desired. The ratio of the weight of the polycarbonate polymer to the volume of the solvent may change some properties of the resulting graft copolymer. In specific embodiments, the ratio (in grams/mL) is about 5:1.

An initiator is then added to the initial solution. The graft copolymer is generally formed through free radical polymerization. Generally, any suitable free radical initiator may be used, such as azo compounds or peroxides. More specific examples of initiators include 2,2'-azobisisobutyronitrile (AIBN), benzoyl peroxide, and di(4-t-butylcyclohexyl)peroxydicarbonate. In particular embodiments, the initiator used is AIBN. The initiator may be added in amounts that can be determined by known means.

Next, a monomer is added to the initial solution to form an intermediate mixture. This monomer will react with the allyl groups in DABPA to form the pendant chain grafted to the polycarbonate backbone. As noted above, exemplary monomers include vinylpyrrolidone and methyl methacrylate. In some embodiments, a period of from about 1 hour to about 2 hours passes between the addition of the initiator and the addition of the monomer. In other embodiments, the initiator and monomer are added simultaneously, i.e. one after another, at the same time, or approximately at the same time. In still other embodiments, a period of from about 5 hours to about 24 hours passes between the addition of the initiator and the addition of the monomer.

The intermediate mixture is then reacted to begin formation of the pendant chains. The reaction may occur for a period of from about 10 minutes to about 100 hours, depending on the desired grafting level, at a temperature of from about 23° C. to the boiling point of the solvent. In particular embodiments, the reaction occurs for a period of from about 5 hours to about 48 hours, including from about 6 hours to about 24 hours and from about 7 hours to about 8 hours. In other embodiments, the temperature of the reaction is from about 40° C. to about 80° C.

It is contemplated in some specific embodiments that the monomer is added over a period of time, rather than all at once. The monomer may be added over an addition period of from about 1 hour to about 24 hours, including from about 7 hours to about 8 hours.

In some particularly desirable embodiments, a second amount of initiator and a second amount of monomer are then added to the intermediate mixture, and the intermediate mixture is then reacted for a second time. This second reaction may again occur for a period of from about 10 minutes to about 100 hours, at a temperature of from about 23° C. to the boiling point of the solvent. In particular embodiments, the second reaction occurs for a period of from about 5 hours to about 24 hours, including from about 7 hours to about 8 hours. In other embodiments, the temperature of the reaction is from about 40° C. to about 80° C. In other embodiments, the intermediate mixture undergoes a total reaction time of from about 6 hours to about 48 hours. It has been found that this two-step reaction profile increases the grafting level of the resulting graft copolymer, both in terms of the number of pendant chains grafted and in the weight average molecular weight of the pendant chains.

Chain transfer agents can be added to the mixture to control the molecular weight of the graft copolymer, polymerization rate, or the nature of the end groups. Typical chain transfer agents include thiols, disulfides, monosulfides, halocarbons, unsaturated compounds, and cobalt complexes. As discussed further herein, the Mw is correlated with the overall haze of the resulting polycarbonate graft copolymer.

After completion of the reaction, the mixture is cooled to room temperature and the resulting polycarbonate graft copolymer can be precipitated out of solution. An excess of any suitable precipitation liquid, such as methanol or ethanol, can be used. For example, the volume of the precipitation liquid can be about 3 times the volume of the mixture/solution containing the polycarbonate graft copolymer. In some embodiments, the precipitated polycarbonate graft copolymer can be filtered and dried.

It may be desirable to wash the precipitated product to remove impurities, such as homopolymers formed from the monomer added for grafting, and unreacted monomer. This can be done by washing or immersing the precipitated product in a liquid in which the desired graft copolymer is insoluble but the undesired impurities are soluble (or vice versa). For example, PMMA is soluble in acetone, whereas the polycarbonate graft copolymer is not. As another example, PVP is soluble in water, but the polycarbonate graft copolymer is not. The remaining purified graft copolymer is then dried.

These processes can be carried out as continuous, semi-batch, or batch processes.

The polycarbonate graft copolymers may be blended or combined with other polymers to form polymeric compositions with useful properties. The polycarbonate graft copolymers may also be combined with other additives to meet a desired specification(s). In a further embodiment, the additives are selected so as not to adversely affect the desired properties of the polycarbonate graft copolymer. Mixtures of additives may be used. Such additives may be mixed at a suitable time during the mixing of the components. Examples of such additives include fillers, antioxidants, ultraviolet light absorbers, heat stabilizers, light stabilizers, plasticizers, lubricants, antistatic agents, flame retardants, impact modifiers, and anti-drip agents.

For example, in some embodiments, a polycarbonate graft copolymer is blended with a second polycarbonate polymer, such as a BPA homopolymer. Alternatively, in some embodiments, the polycarbonate graft copolymer is simply not washed. As discussed below, some polymer compositions contemplated herein include a polycarbonate graft copolymer having PMMA chains in which PMMA homopolymer has not been removed. In addition, the polycarbonate graft copolymers function well as compatibilizers. In other embodiments, the polycarbonate graft copolymers may be blended with polycarbonate homopolymers, other polycarbonate copolymers, homopolymers corresponding to the monomer(s) present in the pendant chains of the polycarbonate grant copolymer, and/or copolymers including the monomer(s) present in the pendant chains of the polycarbonate grant copolymer.

The polycarbonate graft copolymers of the present disclosure are suitable for use in molding articles. The molded articles can be compression molded, injection molded, blow molded, injection-blow-molded, or extruded. The article can also be a solid sheet, an extruded multi-wall sheet, a cast film, or an extruded film. The article can also be a multi-layered article where a capping layer or outer layer is made from the polycarbonate graft copolymer to take advantage of the surface properties of the polycarbonate graft copolymer. Such multi-layered articles include a co-extruded solid sheet, a co-extruded multi-wall sheet, a co-extruded film, or a film cast onto a separately molded part. Alternatively, the multi-layered article may be made by molding a different resin onto a film made from the polycarbonate graft copolymer. Examples of such applications may include optical lenses or bezels. Multi-layer articles may be useful in consumer electronic products.

The following examples are provided to illustrate the compositions and methods of the present disclosure. The examples are merely illustrative and are not intended to limit devices made in accordance with the disclosure to the materials, conditions, or process parameters set forth therein.

EXAMPLES

The following procedures were used to test the Example polymers described below.

Scratch Resistance

Scratch resistance was determined using an Erichsen Scratch Tester Type 413 according to ISO 1518, by applying a force of 1 Newton to a conical stylus with radius of 0.01 mm to form an indentation on the surface of a sample having a thickness of 0.25 mm and attached to a thicker support with tape. The extent of the indentation was subsequently measured with a Dektak® profilometer and was reported as the height of the indentation measured from the bottom of the indentation to the surface of the sample.

Contact Angle Measurements

Contact angle measurements were carried out on a Krüss Drop Shape Analysis System type DSA 10 Mk2. A droplet of 1.5 µL deionized water was placed on the sample. The droplet was monitored every 0.2 seconds for a period of 10 seconds by a CCD-camera and analyzed by Drop Shape Analysis software (DSA version 1.7, Krüss). The complete profile of the droplet was fitted by the tangent method to a general conic section equation. The angles were determined at both the right and left sides. An average value was calculated for each drop and a total of five drops per sample were measured. The average of the angles of the five drops was taken as the contact angle. This procedure is described in ASTM D7334.

Foci Free Time

An IKAMAG-REB oil bath heater with an IKATRON-ETS thermometer was heated to 60° C. A suspended 250 mL beaker filled with 200 mL milliQ water was placed in the oil bath which was kept at a constant temperature of 60° C.±1° C. The temperature of the water was measured with a Kane-May KM330 thermometer. The sample to be tested was laid on the top of the beaker. The time before water condensed on the sample plaque was measured as the fog free time. Determination of condensation was made visually.

Liquid Adsorption Chromatography

Some polymers were analyzed by liquid adsorption chromatography, which is an interaction chromatography technique that can provide detailed information on the polymer composition. The separation in liquid adsorption chromatography is based on both the interaction between the polymer and the stationary phase and on the solubility of the graft polymer in the eluent mixture. Within certain molecular weight limits, it is possible to separate graft copolymers and homopolymers based solely on their chemical nature. Tetrahydrofuran (THF)/methanol was chosen as the solvent/non-solvent system to separate the graft polymers from bisphenol A homopolymer and poly(methyl methacrylate) homopolymer.

Gel Permeation Chromatography

The molecular weights of a copolymer sample were obtained by dissolving the sample at 1 mg/mL concentration in dichloromethane. The sample was then analyzed by GPC using a Polymer Labs MiniMIX C column, a mobile phase of dichloromethane, and a flow rate of 0.3 mL/min. The detection wavelength was 254 nm. Mw results were reported against polystyrene standards.

Hydrolysis Gel Permeation Chromatography

The molecular weights of the pendant groups on a copolymer sample were obtained by dissolving 0.3 grams of the sample in 5 mL of THF. 3 mL of 10% KOH in methanol was added and the sample was shaken for at least 2 hours. Acetic acid (2 mL) was added to neutralize the sample. Samples were filtered at 0.45 µm before analysis by GPC using a Polymer Labs MiniMIX C column, a mobile phase of dichloromethane, and a flow rate of 0.3 mL/min. The detection wavelength was UV at 254 nm and RI. Mw results were reported against polystyrene standards.

The Examples discussed herein used the following ingredients in their compositions:

| Ingredient | Description | Supplier |
|---|---|---|
| BPA-PC | Polycarbonate homopolymer derived from bisphenol A; Mw = 44,000, Mn = 18,537 measured versus polystyrene standards | SABIC Innovative Plastics |
| DABPA-PC | Polycarbonate copolymer derived from a Bisphenol A and Diallyl bisphenol A (10 mole % DABPA); Mw = 34,000, Mn = 10,400 measured versus polystyrene standards | SABIC Innovative Plastics |
| MMA | Methyl methacrylate | Aldrich |
| VP | N-Vinyl-2-pyrrolidone | Acros Organics |
| AIBN | 2,2'-Azobisisobutyronitrile | Aldrich |
| BPO | Benzoyl peroxide | Acros Organics |
| Perkadox 16 | Di(4-tert-butylcyclohexyl)peroxydicarbonate | AkzoNobel |

Examples 1-3

Examples 1-3 were performed to determine whether the choice of initiator would affect the grafting efficiency. The grafting efficiency can have an effect on the optical properties or the surface properties of the resulting polymer. For Example 1, MMA was grafted onto DABPA-PC using AIBN as a radical initiator. In a 250 mL round-bottomed flask equipped with a stirring bar, dropping funnel, and condenser, 10 grams DABPA-PC was added, followed by 200 mL of THF solvent. The temperature was kept constant at 65° C. while stirring, until the DABPA-PC copolymer dissolved, resulting in a clear solution. Next, 300 mg of AIBN initiator was dissolved in 10 mL of THF. The initiator/THF solution was then added to the flask containing the dissolved copolymer. The polymer solution was stirred at this temperature for 2 hours before the introduction of MMA monomer. 5 mL of MMA monomer was dissolved in 20 mL of THF and then added dropwise to the flask over 3-4 hours. After monomer addition, the reaction system was kept at 65° C. while stirring overnight. The solution was then cooled down to room temperature and the polymer was recovered through precipitation in an excess amount of methanol or ethanol. The polymer was separated by filtration and dried at 80° C. for 6 hours in a vacuum oven.

Example 2 was made using the same procedure as Example 1, but with BPO as the initiator instead of AIBN.

Example 3 was made using the same procedure as Example 1, but with Perkadox 16 as the initiator instead of AIBN.

The three graft copolymers (Examples 1-3) were compared to a blend of PMMA and DABPA-PC. PMMA and DABPA-PC were blended in a 1:2 weight ratio in dichloromethane. In other words, this blend had 33.3 wt % PMMA and 66.7 wt % DABPA-PC.

The three Examples, the DABPA-PC, and PMMA homopolymer were characterized by gel permeation chromatography (GPC) and liquid adsorption chromatography).

Figure 1:
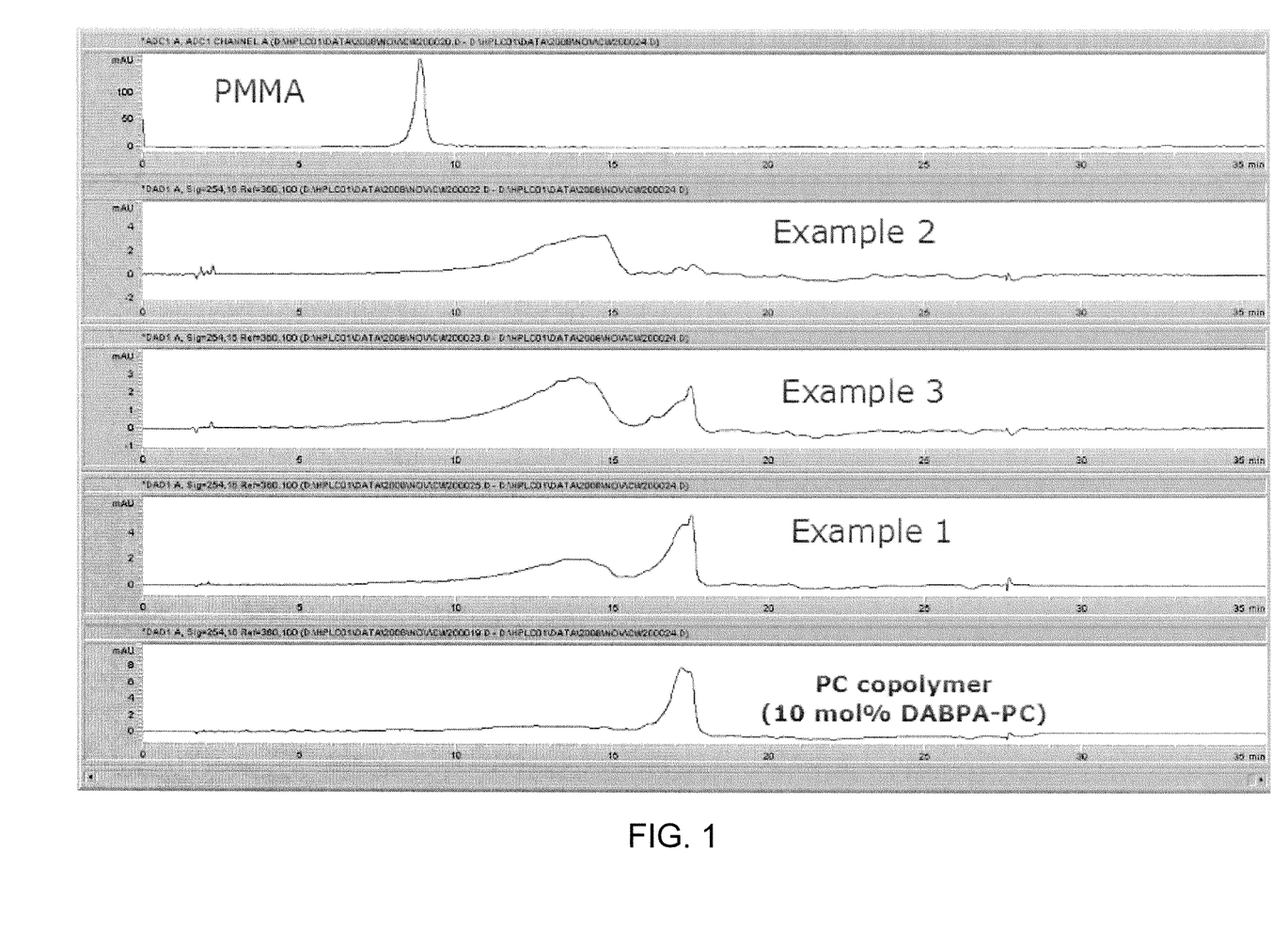
FIG. 1 is a liquid adsorption chromatography graph of three different polycarbonate graft copolymer samples and two reference samples.

FIG. 1 shows the liquid adsorption chromatography diagrams for these five samples. The liquid adsorption chromatography diagrams were made by applying a gradient of from 100% methanol to 100% THF over 20 minutes. The y-axis is mAU, and measures absorbance on a relative scale. The x-axis is time. Pure PMMA eluted at a retention time of 9.0 minutes while pure DABPA-PC eluted at 17.5 minutes. The liquid adsorption chromatography profiles of Examples 1, 2, and 3 showed peaks centered around a retention time of 14.5 minutes which is clearly separated from the profiles of the two homopolymers.

Films for scratch testing and transparency testing were prepared via solvent casting in a Petri dish for the three Examples, DABPA-PC and the PMMA/DABPA-PC blend. The solvent was evaporated in a fume hood and the films recovered from the Petri dish. For Table 1, a force of 6 Newtons was applied during the scratch test. The scratch results for a BPA-PC homopolymer are also listed. Results are summarized in Table 1. The results for Mw, Mn, and PDI are for the copolymer (not pendant groups).

Examples 4 and 5

Examples 4 and 5 were performed to determine the anti-fog properties of polycarbonate-graft-PVP copolymers and whether the amount of PVP affected the properties. For Example 4, VP was grafted onto DABPA-PC. The resulting polycarbonate copolymer was compared to a control DABPA-PC polymer. 20 grams of DABPA-PC were dissolved in 400 mL of THF at 65° C. in a 500 mL round-bottomed flask. The polymer was dissolved in the THF as a clear solution. 200 mg AIBN and 5 mL of VP monomer dissolved in 20 mL THF was added dropwise to the solution within 3 to 4 hours. The reaction was kept at 65° C. while stirring overnight. The reaction solution was then cooled to room temperature and the polymer was recovered by precipitation in methanol. The polymer was separated by filtration and dried at 95° C. for 6 hours in a vacuum oven.

Example 5 was made using the same procedure as Example 4, but with 10 mL of VP monomer added to the flask instead of just 5 mL.

The specimens for anti-fog tests including contact angle and fog free time were prepared by dissolving 2.0 grams of the polymers of Examples 4 and 5 and DABPA-PC in 20 mL dichloromethane and casting the solution in a Petri dish. When the solvent was evaporated in the fume hood, the film was obtained. The results are summarized in Table 2.

TABLE 2

| Sample | Transparent? | Contact angle (°) | Fog Free time |
| --- | --- | --- | --- |
| DABPA-PC | Yes | 85 | <5 sec |
| Example 4 | Yes | 41 | <5 min |
| Example 5 | Yes | 40 | >30 min |

The graft copolymers of Examples 4 and 5 exhibited significantly lower contact angles and significantly higher fog free time than the control DABPA-PC homopolymer. This indicates that the graft copolymers have good anti-fog properties, which are useful for certain applications. Example 5,

TABLE 1

| Sample | Initiator | Mw g/mol | Mn g/mol | PDI Mw/Mn | Thickness mm | Erichson scratch depth μm | Transparency % | Haze % |
| --- | --- | --- | --- | --- | --- | --- | --- | --- |
| DABPA-PC | — | 34,000 | 10,400 | 3.27 | 0.27 | 24 | 91.0 | 1.9 |
| Example 1 | AIBN | 38,300 | 12,900 | 2.97 | 0.25 | 21 | 91.0 | 1.5 |
| Example 2 | BPO | 40,700 | 12,400 | 3.28 | 0.22 | 17 | 87.0 | 86.0 |
| Example 3 | Perkadox 16 | 41,500 | 12,300 | 3.37 | 0.17 | 20 | 90.0 | 85.0 |
| PMMA/DABPA-PC Blend | — | — | — | — | 0.34 | 16 | 89.0 | 97.0 |

The results in Table 1 suggested that using different initiators affected the transparency and haze of the resulting copolymer. The graft copolymer produced using AIBN initiator exhibited the highest transparency and the lowest haze. Examples 1-3 had a higher Erichson scratch depth than the PMMA/DABPA-PC blend, but a lower Erichson scratch depth than the DABPA-PC copolymer. The graft copolymer of Example 1 also had comparable transparency and haze to DABPA-PC, whereas the PMMA/DABPA-PC blend had much worse haze. In other words, the graft copolymer could be used in applications requiring high transparency and/or low haze, whereas a blend of the same two polymers could not be used.

produced by the addition of twice the monomer of Example 4, exhibited an increase in fog free time of over 6 times. Put another way, a higher concentration of VP in the graft copolymer significantly improved the anti-fog performance. The transparency of the Examples appeared visually to be as good as the starting material.

Examples 6-13

In Examples 6-12, some process parameters were varied to determine their effect on the resulting graft copolymer. In Example 6, the starting polycarbonate copolymer comprised 10 mole % DABPA and 90 mole % BPA. 10 grams of the starting polycarbonate copolymer was dissolved in 50 mL of THF. The reaction temperature was 65° C. After the copolymer was dissolved, 300 mg of Perkadox 16 initiator was added. The initiator was recrystallized from cold methanol before use. After 60 minutes, 10.7 mL MMA monomer was added and the reaction proceeded for 22 hours. After 22 hours, another 10 mL of MMA and 300 mg of Perkadox 16 were added, and the reaction proceeded for an additional 22 hours. The product of the reaction was precipitated in methanol, where the volume of the precipitation liquid was 3 times the volume of the product solution. The final product was filtered 1 hour after the precipitation. The obtained solid was washed by immersion in acetone and stirring overnight to remove PMMA homopolymer. The remaining PMMA after purification was linked to the PC backbone which was confirmed by the liquid adsorption chromatography process described above.

Example 7 was made using the same procedure as Example 6, except the obtained solid graft copolymer was not washed with acetone to remove PMMA homopolymer.

Example 8 was made using the same procedure as Example 6, except that the starting polycarbonate copolymer comprised 5 mole % DABPA and 95 mole % BPA.

Example 9 was made using the same procedure as Example 8, except all 20.7 grams of the MMA monomer was added very gradually over 7 hours using an HPLC pump instead of in two additions. In addition, Example 9 had a total reaction time of 23 hours, versus 44 hours for Examples 6 and 8.

Example 10 was made using the same procedure as Example 8, except that the two amounts of the monomer and initiator were added in one step upfront at the beginning at the same time, i.e. 20.7 mL MMA and 600 mg Perkadox 16 without any waiting time between them. No second amount of initiator or monomer was added. Example 10 had a total reaction time of 22 hours, versus 44 hours for Examples 6 and 8. However, it should be noted that data collected here indicated stability in the resulting values for reaction times up to 52 hours.

Example 11 was made using the same procedure as Example 8, except the starting polycarbonate polymer was dissolved in 250 mL of THF instead of only 50 mL.

Example 12 was made using the same procedure as Example 6, except the starting polycarbonate copolymer was a BPA homopolymer having eugenol endcaps. This resulted in the formation of a BPA-block-PMMA copolymer, rather than a graft copolymer.

Example 13 was performed on a polycarbonate polymer without allyl groups to determine whether a graft copolymer could be formed when allyl groups were absent. Example 13 was made using the same procedure as Example 6, except the starting polycarbonate copolymer was a dimethyl bisphenol cyclohexane (DMBPC) homopolymer having the repeating structure of Formula (VI):

Formula (VI)

Six reference samples were also measured for comparison of properties. Reference 1 was a blend of 18 wt % PMMA and 82 wt % BPA-PC. Reference 2 was a blend of 50 wt % PMMA and 50 wt % DMBPC homopolymer. Reference 3 was a BPA homopolymer (Lexan® LX172 resin). Reference 4 was a PMMA homopolymer.

A summary of the results of Examples 6-13 can be found in Tables 3 and 4. Table 3 shows the amount of PMMA incorporated into each sample, the light transmission (% T), haze, and scratch depth. For Table 3, a force of 1 Newton was applied during the scratch test. Table 4 provides additional information on the Mw, Mn, and polydispersity index (PDI) for the overall graft copolymer and for the PMMA chains grafted onto the polycarbonate backbone. For reference, a higher % T value is desirable, while a lower haze number is desirable. The % T, haze, and scratch depth were measured on casted films with 0.25 mm thickness.

TABLE 3

| Sample | Composition | % PMMA before washing | % PMMA after washing | % T | haze | scratch depth (nm) |
|---|---|---|---|---|---|---|
| Example 6 | 10% DABPA | 56 | 37 | 90.8 | 0.6 | 3410 |
| Example 7 | 10% DABPA | 56 | — | 90.4 | 0.5 | 2836 |
| Example 8 | 5% DABPA | 62 | 15 | 89.7 | 29.2 | 3510 |
| Example 9 | 5% DABPA | 65 | 25 | 81.7 | 63.5 | 3760 |
| Example 10 | 5% DABPA | 65 | 18 | 89.2 | 18.1 | 5141 |
| Example 11 | 5% DABPA | 54 | 11 | 91.0 | 3.0 | 4064 |
| Example 12 | BPA/PMMA Block | — | 5 | 59.4 | 98.6 | — |
| Example 13 | 100% DMBPC | 45.3 | <0.5 | — | — | — |
| Reference 1 | 18/82 PMMA/BPA | | | 89.3 | 90.2 | |
| Reference 2 | 50/50 DMBPC/BPA | 47.4 | <0.5 | | | |
| Reference 3 | 100% BPA | | | | | 6609 |
| Reference 4 | PMMA | | | | | 2395 |

TABLE 4

| | Graft Copolymer | | | PMMA chains only | | |
|---|---|---|---|---|---|---|
| Sample | Mw | Mn | PDI | Mw | Mn | PDI |
| Example 6 | 116199 | 41198 | 3.91 | 57849 | 19299 | 3.00 |
| Example 8 | 69389 | 25527 | 2.73 | 25022 | 12350 | 2.03 |
| Example 9 | 81919 | 28890 | 2.90 | 84023 | 35041 | 2.39 |
| Example 10 | 89142 | 29427 | 3.03 | 26172 | 12185 | 2.15 |

Example 6 achieved very good results because it had a very high graft level (37%) but still had very high transparency and a very low haze number. When the sample was unwashed (Example 7), the amount of PMMA was 19 wt % higher. The difference can be explained by PMMA homopolymer and MMA monomer that is removed by the washing step. However, even when the homopolymer was still present, Example 7 produced a transparent film, as reflected in both the high % T and the low haze. This result was unexpected because blending 18% PMMA homopolymer with BPA-PC results in significant haze formation, as seen in Reference 1. However, skipping the washing step with lower graft levels results in hazy products. One non-limiting theory is that highly grafted polycarbonate copolymer acts as a compatibilizer with PMMA homopolymer, so that transparent product can still be obtained. Graft levels of at least about 25% may be required for the graft copolymer to act as an effective enough compatibilizer to allow the washing step to be omitted while still resulting in a transparent product.

Examples 6 and 8 differed in the amount of DABPA in the starting polycarbonate copolymer (10% vs. 5%). Example 6 had a higher graft level (37 wt % PMMA vs. 15 wt %), but much better haze and higher transparency. This result was unexpected. Typically, transparency decreases and haze increases when the graft level increases for the same type of backbone polymer due to incompatibility between the backbone and the pendant chains. Thus, it was expected that Example 8 would have better haze and transparency. One possible hypothesis for this result is that having more grafting sites (i.e. higher percentage of DABPA) resulted in a lower Mw for the pendant PMMA chains for the same graft level (wt % PMMA) because there are more sites for the MMA monomers to attach to, resulting in better compatibility and lower haze by minimizing the domain formation of PMMA within a DABPA matrix. Another hypothesis is that the length of polycarbonate between grafting points drives the separation between polycarbonate and PMMA that causes haziness, so the lower number of BPA monomers between DABPA monomers in Example 6 (i.e. shorter length between grafting points) improves the haze.

Examples 8 and 10 differed in that Example 8 used a two-step reaction profile (two additions of monomer and initiator), while Example 10 used a one-step reaction. The graft level of the resulting copolymer using the two-step profile was increased by about 30-50% relative to using the one-step reaction. One possible and non-limiting explanation is that active radicals are lost due to termination reactions and monomer is lost due to homopolymerization over time. Subsequently adding second amounts of monomer and initiator may reinitiate the grafting reaction.

Example 12 was a block copolymer, not a graft copolymer. Example 12 had higher haze and lower transparency than the graft copolymers of Examples 6 and 8. It is believed that the graft copolymers have a much less regular (i.e. periodic) structure and more degrees of freedom than block copolymers, so they can less easily phase separate. Phase separation is believed to be the cause of haze, so the graft copolymer should have less haze than a similar block copolymer.

Examples 8-11 were compared because they had the same copolymer backbone. Examples 8 and 9 differed in the amount of time over which the MMA monomer was added to the DABPA-PC. Adding the monomer continuously over time resulted in longer PMMA graft chain lengths (both Mw and Mn).

As seen in Examples 8 and 11, increasing the amount of solvent decreased the amount of PMMA grafting. However, the haze number was also reduced.

Figure 2:
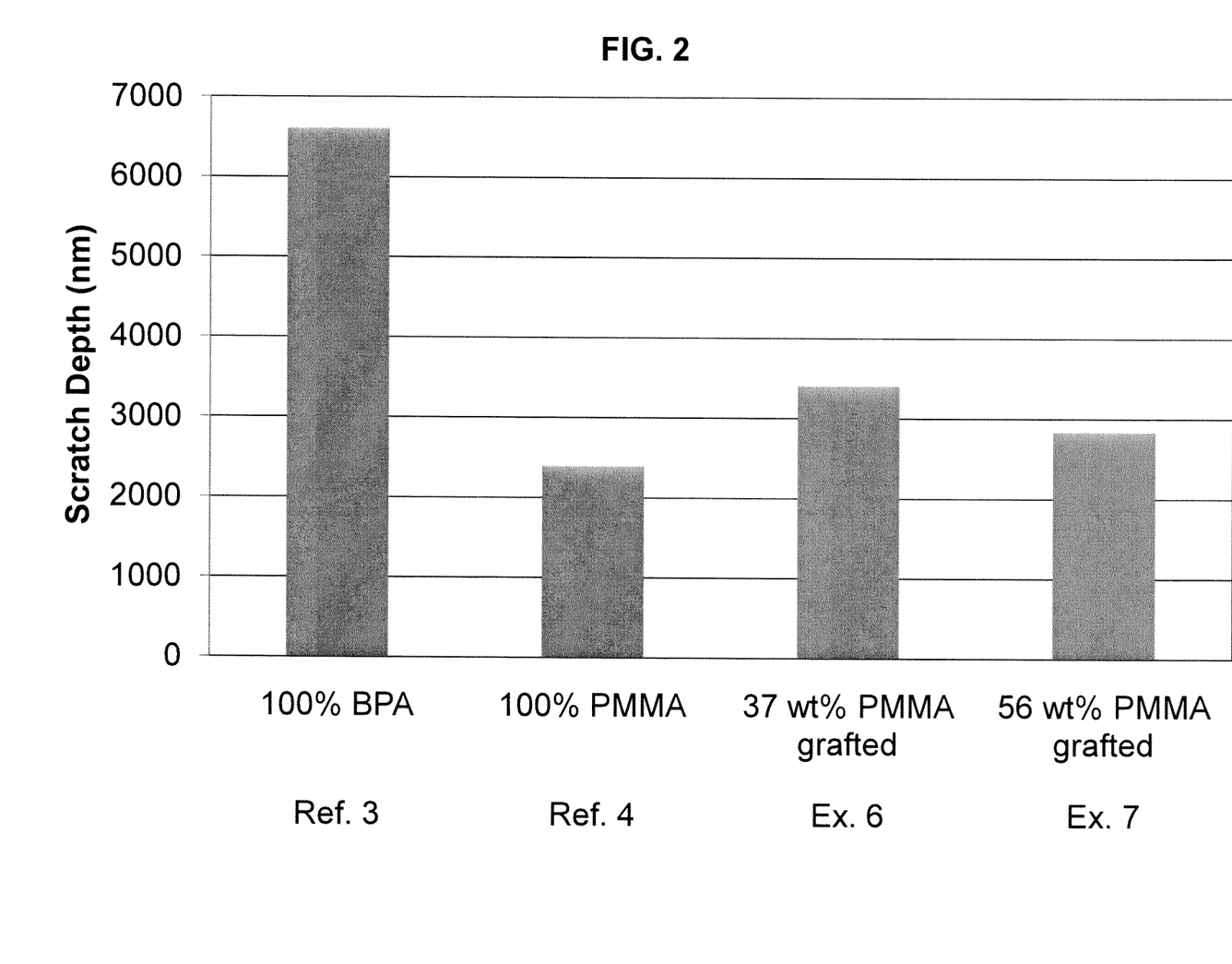
FIG. 2 is a graph showing the scratch depth for various reference polymers and polycarbonate graft copolymers produced in accordance with the present disclosure.

FIG. 2 is a graph showing the scratch depth of plaques made using the materials of Reference 3 (100% BPA), Reference 4 (100% PMMA), Example 6 (37 wt % PMMA), and Example 7 (56 wt % PMMA). The effect of PMMA incorporation on scratch resistance is very high at low loadings, and higher loadings tend to lower the scratch depth. This non-linear effect for the PMMA-containing polymers was unexpected, and it is hypothesized that this could be due to morphology or micro-domain effects.

Example 13 was performed to determine whether PMMA would graft onto a polycarbonate without allyl groups by simply adding initiator and monomer. After washing, less than 0.5 wt % PMMA was found for Example 13. Reference 2 shows the result for a blend of DMBPC homopolymer and PMMA homopolymer. After washing, less than 0.5% PMMA was found in Reference 2 as well. These results suggest that no detectable grafting occurs on polycarbonates which do not contain allyl groups under the conditions of the presently disclosed examples such as reaction time, temperature, and initiator concentration.

Example 14

Example 14 was performed to determine whether the process conditions affected the resulting anti-fog properties of a polycarbonate-graft-PVP copolymer. In a 500 mL reactor, 10 grams of DABPA-PC was added to 400 mL of THF. The mixture was heated to 65° C. under nitrogen atmosphere. The polymer dissolved into the THF over the next 30 minutes. 10 mL of VP monomer was then added and 200 mg of AIBN was added. After 22 hours of reaction time, another loading of 10 mL VP monomer and 200 mg AIBN was added and the reaction was carried out for another 22 hours. To remove any PVP homopolymer and unreacted VP, the resulting polymer was precipitated in diethylether and washed two times overnight in water (PVP is soluble in water). The washed precipitate was filtered off and dried.

To cast a film, 2 grams of the graft copolymer was dissolved in 20 mL of dichloromethane which was poured into a glass Petri dish with a diameter of 8 cm. The dichloromethane was allowed to evaporate slowly, resulting in a film having a thickness of approximately 0.2 mm.

The surface in contact with the glass had a lower contact angle and higher hydrophilicity than the surface in contact with air. The surface in contact with glass had a contact angle of 33°, while the surface in contact with air had a contact angle of 65°. One hypothesis for this result is that glass is more polar than air, so the polar PVP grafts are attracted to the glass surface, resulting in a lower contact angle. When compared to the contact angles of Examples 4 and 5 (Table 2), it is clear that the method of preparation has an influence on the contact angle of the graft copolymer.

Examples 15-16

Two more samples were made grafting VP onto a DABPA-PC polycarbonate copolymer backbone. For Example 15, the resulting polycarbonate-graft-PVP copolymer was about 50 wt % PVP.

For Example 16, a polycarbonate-graft-PVP copolymer was made that was about 10 wt % PVP. This graft copolymer was then blended with DABPA-PC, the graft copolymer being about 20 wt % of the blend.

The specimens were again tested for contact angle and fog free time. The results are summarized in Table 5.

TABLE 5

| Sample | Transparent? | Contact angle (°) | Fog Free time |
|---|---|---|---|
| DABPA-PC | Yes | 85 | <5 sec |
| Example 15 | Yes | 33 | >30 min |
| Example 16 | Yes | 43 | >30 min |

Again, the graft copolymers of Examples 15 and 16 exhibited significantly lower contact angles and significantly higher fog free time than the control BPA-PC homopolymer.

Examples 17-19

Examples 17-19 were run to obtain samples having different haze values to determine whether the molecular weight affected the haze/transparency of the resulting copolymer. Examples 8-10 and 14-16 were also used in this determination. In all of these Examples, the starting polycarbonate copolymer comprised 5 mole % DABPA and 95 mole % BPA. A polycarbonate-graft-PMMA copolymer was then formed using the procedure described in Example 6.

Example 18 was made using the same procedure as Example 6, except that only 150 mg of Perkadox 16 was added each time instead of 300 mg.

After measuring the haze of the graft copolymer, the graft copolymer was hydrolyzed to obtain the Mw and Mn of the PMMA chains that were grafted on the polycarbonate backbone. The Mw and Mn were measured relative to polystyrene standards. The results for Examples 8-10 and 14-19 are shown in Table 6.

TABLE 6

| Sample | % PMMA after washing | % T | haze | PMMA chains only | | |
|---|---|---|---|---|---|---|
| | | | | Mw | Mn | PDI |
| Example 8 | 15 | 89.7 | 29.2 | 25022 | 12350 | 2.03 |
| Example 9 | 25 | 81.7 | 63.5 | 84023 | 35041 | 2.39 |
| Example 10 | 18 | 89.2 | 18.1 | 26172 | 12185 | 2.15 |
| Example 14 | 24.8 | — | 26.7 | 24588 | 11163 | 2.20 |
| Example 15 | — | — | 24.4 | 26497 | 13073 | 2.03 |
| Example 16 | — | — | 42.1 | 41738 | 20040 | 2.08 |
| Example 17 | — | — | 34.5 | 43837 | 15583 | 2.81 |
| Example 18 | 25.6 | — | 74.5 | 47112 | 22712 | 2.07 |
| Example 19 | — | — | 86.6 | 59935 | 26229 | 2.29 |

Figure 3:
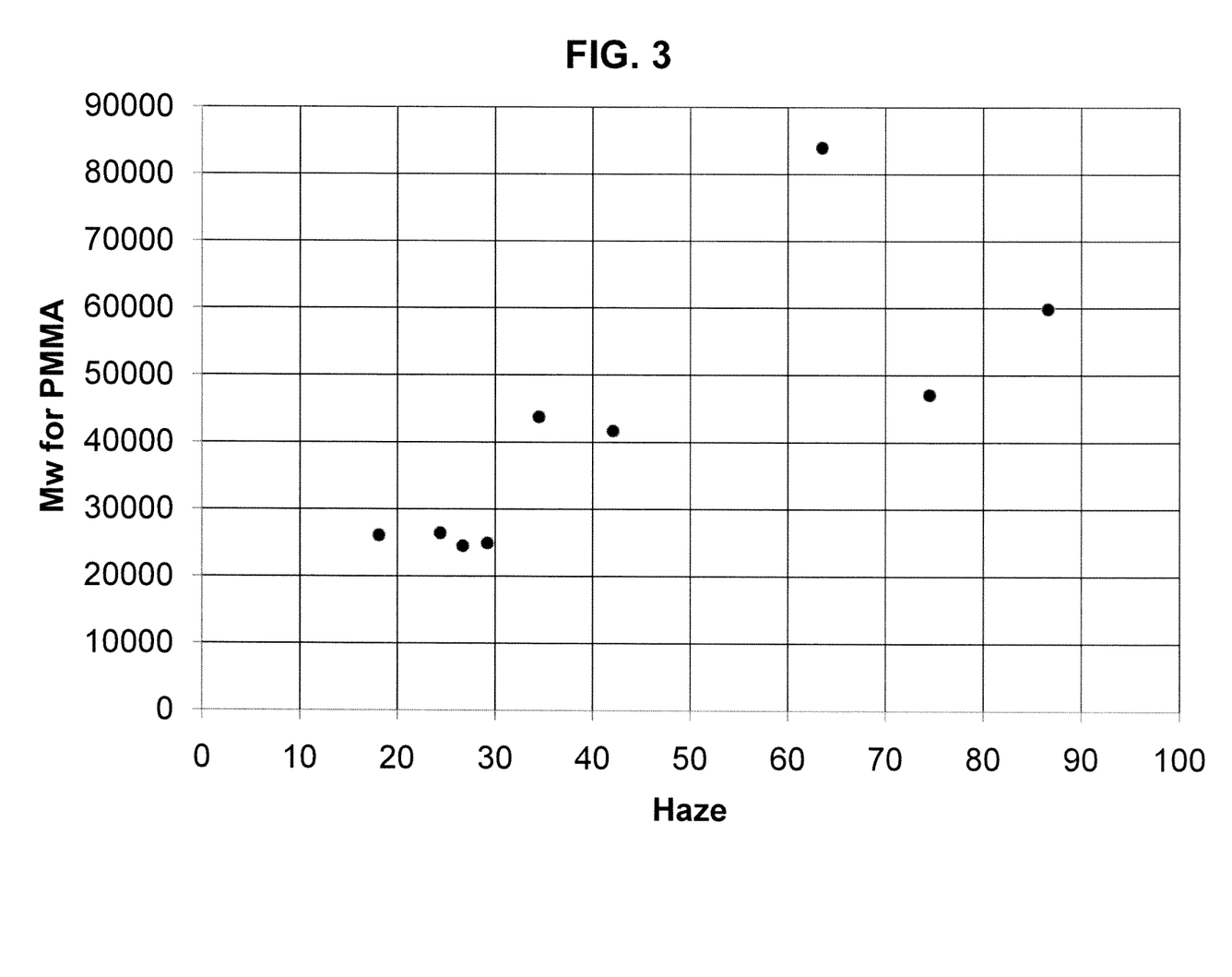
FIG. 3 is a graph showing the relationship between the weight average molecular weight of pendant PMMA chains and the transparency of exemplary graft copolymers of the present disclosure.

FIG. 3 is a graph showing the Mw of the PMMA chains grafted onto the polycarbonate polymer backbone versus the haze. This graph shows that the Mw of the grafted PMMA chains is related to the haze of the graft copolymer. In particular, graft copolymers having a haze value below 30 generally had Mw's from 20,000 to 40,000.

Figure 4:
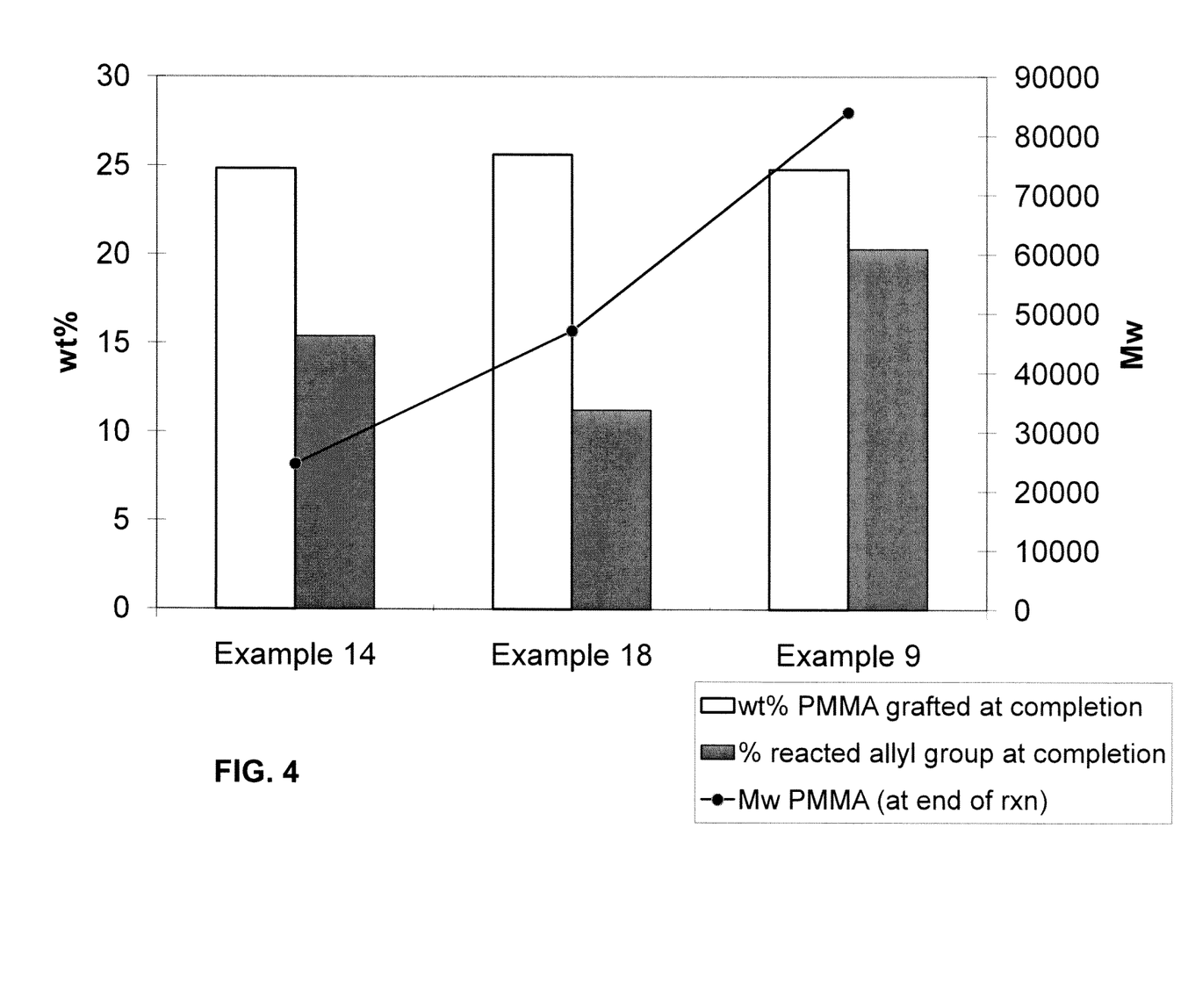
FIG. 4 is a graph showing the effect of slow/continuous addition of monomers on the resulting polycarbonate graft copolymer.

FIG. 4 is a graph showing the effect of slow/continuous addition of monomers on the resulting polycarbonate graft copolymer. Examples 14, 18, and 9 were compared on three properties: the % PMMA grafted at completion (i.e. after washing), the % of reacted allyl groups at completion, and the Mw of the PMMA chains. These three Examples were chosen because they all contained about 25% PMMA after washing. Examples 14 and 18 differed in the amount of initiator added; Example 18 used half the amount of initiator as Example 14). As expected, the percentage of reacted allyl groups in Example 18 was lower, although it was not reduced by half. Also as expected, the Mw of the PMMA chains in Example 18 was higher. One interesting result was that the Mw of the PMMA chains in Example 18 was almost 2 times higher than in Example 14, even though the percentage of reacted allyl groups was not reduced by half.

Examples 14 and 9 differed on the method in which the MMA monomer was added; Example 14 used two discrete additions and had a total reaction time of 44 hours, while Example 9 added monomer gradually over 7 hours and had a total reaction time of 23 hours. The percentage of reacted allyl groups was higher in Example 9, and the Mw of the PMMA chains was almost 3.5 times greater in Example 9. The continuous addition of Example 9 increased the number of allyl groups to which PMMA chains are grafted.

Examples 20-34

A conversion study of a polycarbonate-graft-PVP copolymer was done. The starting polycarbonate copolymer comprised 5 mole % DABPA and 95 mole % BPA. 10 grams of the starting polycarbonate copolymer was dissolved in 400 mL of THF. The reaction temperature was 65° C. After the copolymer was dissolved, 10 mL of VP monomer and 200 mg of AlBN initiator were added. After addition of initiator, time measurement was started. The initiator was recrystallized from cold methanol before use. After 30 seconds, a first sample was taken which is used as Example 20. Example 21-27 were taken at different moments in the 7 hours after starting the reaction. At 7 hours, another 10 mL of VP monomer and 200 mg of AlBN were added. Examples 28-34 were taken after this second addition.

The samples obtained at different times during the reaction were cooled. After finishing the experiment, all samples were dried by evaporating the THF, then washed 2 times with water to remove PVP homopolymer. After purification and drying in a vacuum (over 50° C., ~2 mbar), the samples were analyzed using NMR. The results are presented in Table 7.

TABLE 7

| Sample | Reaction Time (hours) | % PVP after washing |
|---|---|---|
| Example 20 | 0.01 | 3.0 |
| Example 21 | 0.08 | 2.6 |
| Example 22 | 0.17 | 2.7 |
| Example 23 | 0.50 | 8.8 |
| Example 24 | 1.00 | 12.8 |
| Example 25 | 2.00 | 16.7 |
| Example 26 | 4.00 | 17.8 |
| Example 27 | 7.00 | 19.4 |
| Example 28 | 7.33 | 21.6 |
| Example 29 | 7.66 | 22.6 |
| Example 30 | 8.00 | 23.1 |
| Example 31 | 24.00 | 37.6 |
| Example 32 | 28.25 | 38.5 |
| Example 33 | 29.50 | 41.5 |
| Example 34 | 32.00 | 41.0 |

Figure 5:
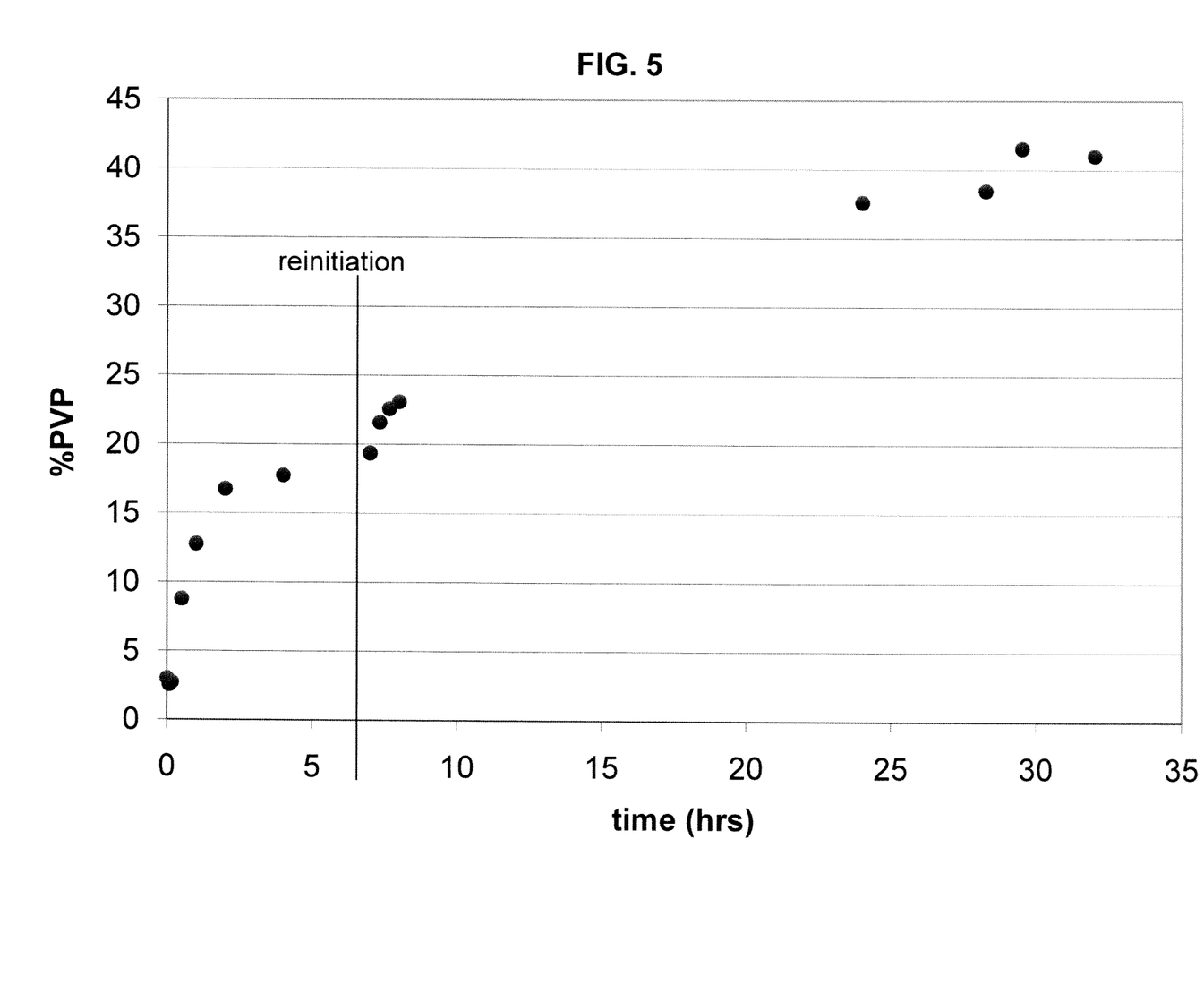
FIG. 5 is a graph showing the amount of monomer grafted onto a polycarbonate backbone over time.

FIG. 5 is a graph showing the amount of vinylpyrrolidone grafted versus the reaction time. The percentage levels off after approximately 7 hours. Adding another charge of monomer and initiator results in another increase in grafting. From this, it can be concluded that a reaction time of about 7 hours to about 8 hours is sufficient for the grafting reaction. After that time, the material can be isolated or a second charge of monomer and initiator can be added to induce further grafting. The same phenomenon was noticed for grafting PMMA onto a DABPA homopolymer.

The graft copolymers of the present disclosure have been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof. For example, the combinations and sub-combinations of the dependent claims should be considered to be disclosed herein. References to a range in, for example mole %, time period, or temperature, should be considered as including any intermediate values within the range, and as including any sub-ranges within the disclosed range.

The invention claimed is:

1. A graft copolymer comprising:
a polycarbonate polymer backbone comprising repeating units derived from diallyl bisphenol A (DABPA), repeating units derived from bisphenol A (BPA), and repeating units derived from either 1,1-bis(4-hydroxy-3-methylphenyl)cyclohexane (DMBPC) or 2,2-bis(4-hydroxy-3-methylphenyl)propane (DMBPA); and
polyvinylpyrrolidone pendant chains grafted to the polycarbonate copolymer backbone.

2. The graft copolymer of claim 1, wherein the repeating units derived from diallyl bisphenol A (DABPA) comprise at least 5 mole % of the polycarbonate polymer backbone.

3. The graft copolymer of claim 1, wherein the graft copolymer has a water contact angle of less than about 45° as measured by ASTM D7334.

4. The graft copolymer of claim 1, wherein the pendant chains comprise from 2 to about 60 wt % of the graft copolymer.

5. The graft copolymer of claim 1, wherein the pendant chains have a weight average molecular weight of from about 20,000 to about 60,000.

6. The graft copolymer of claim 1, wherein the pendant chains have a weight average molecular weight of from about 20,000 to about 40,000.

7. A molded article comprising the graft copolymer of claim 1.

* * * * *